Dec. 27, 1966   R. F. NELSON   3,295,085

SEMICONDUCTOR STRAIN TRANSDUCER DEVICE

Filed Sept. 3, 1963

INVENTOR
ROGER F. NELSON
BY
AGENT

United States Patent Office 3,295,085
Patented Dec. 27, 1966

3,295,085
SEMICONDUCTOR STRAIN TRANSDUCER DEVICE
Roger F. Nelson, Mountain View, Calif., assignor to Raytheon Company, Lexington, Mass., a corporation of Delaware
Filed Sept. 3, 1963, Ser. No. 306,266
9 Claims. (Cl. 338—2)

This invention relates to a strain-sensitive semiconductor device, and more particularly to a technique for mounting or suspending a stress-applying member to permit variations in stress to be applied to a strain-sensitive semiconductor device.

The invention uses as its principal element a strain transducer described in copending United States applications, Serial No. 183,940, filed on March 30, 1962, now abandoned, and Serial No. 261,065, filed on February 26, 1963 by Wilhelm Rindner and assigned to the assignee of this invention. The strain transducer disclosed in the above-mentioned copending applications is particularly useful due to its high electrical sensitivity. This strain transducer can achieve current changes in magnitude of as much as four orders greater than previously obtainable upon the application of forces of approximately five gram weights applied to a surface of the transducer. Thus, changes in junction parameters by factors of the order of ten thousand are obtainable with this highly sensitive transducer device. The achievement of this sensitivity is accomplished by locating a junction between regions of semiconductor material only slightly below a surface of one of said regions and selecting a small portion of said surface upon which to concentrate nonuniform anisotropic stresses to produce such radical changes in junction parameters. Such sensor or strain transducer devices are readily adaptable for measuring pressure, force, or other physical changes.

In the past, difficulties have been encountered in attempting to fabricate and construct the aforementioned strain transducer of the copending application, particularly due to the difficulty in mounting or suspending a stress or force-producing member so as to permit a portion of the stress-producing member to contact a surface of a transducer device. Mechanical structures, such as pivotal arms and other laboratory mounting techniques, such as rigidly holding the force-producing member above a surface of the strain transducer, have been attempted but these techniques are not readily suitable for production-type items. Accordingly, to alleviate the aforementioned difficulties and provide a structure which would be easily fabricated and at the same time provide the desired rigidity, a new technique was required. Accordingly, it is a primary object of this invention to provide a new technique for mounting or suspending a stress-producing member in contact with a sensor. It is a further object of this invention to provide a mounting technique which is easily adaptable for production, fabrication, and construction. It is an additional object of this invention to provide a material for positioning a stress-producing member which is deformable to a greater degree than said stress-producing member.

In accordance with this invention, a semiconductor device having a strain-sensitive region disposed between regions of semiconductor material is utilized in conjunction with a member for producing a strain in said device, said member being suspended or held in contact with said semiconductor device by a material which is more easily deformed than said member.

Other objectives or features of this invention will become apparent from the following description taken in conjunction with the following drawings, wherein.

Figure 1:
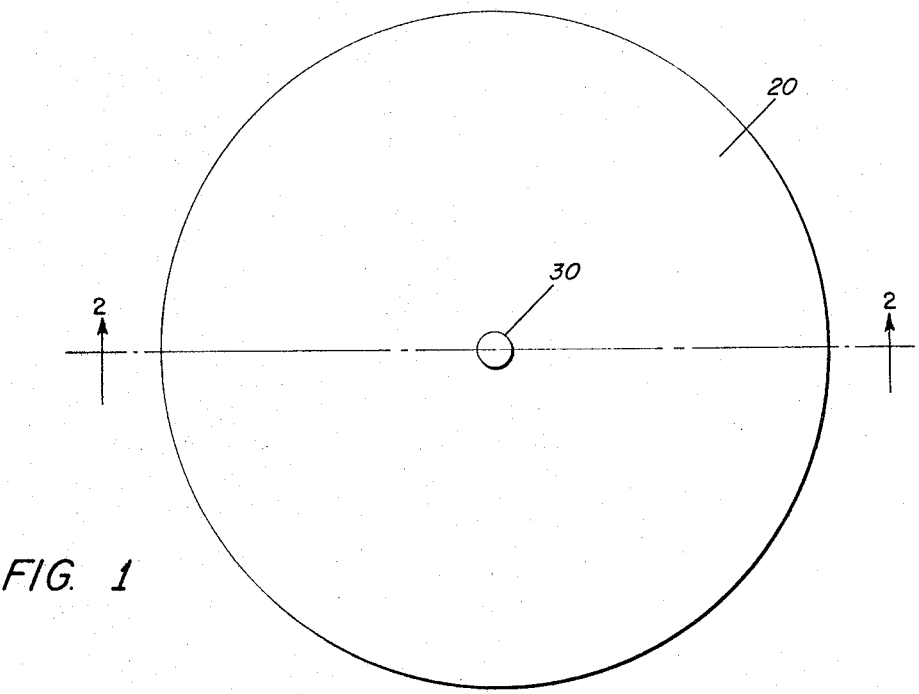
FIG. 1 is a top plan view of the sensor according to this invention.
Figure 2:
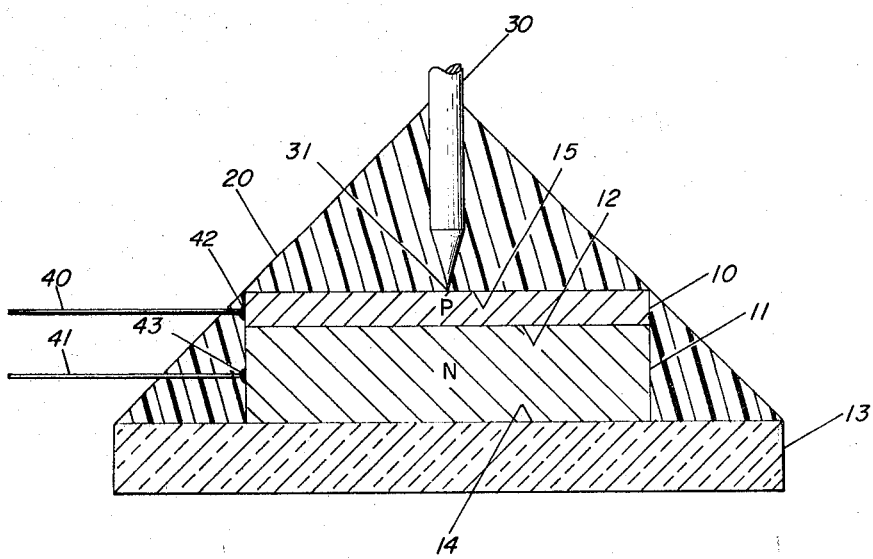
FIG. 2 is a cross-sectional view along line 2—2 of FIG. 1 showing the configuration of the sensor according to this invention.

Referring now to FIGS. 1 and 2, there is shown the sensor or transducer device according to this invention which includes a deformable material for suspending a stress-producing member in contact with a semiconductor strain sensitive device. A first region 10 of P-type semiconductor material is shown mounted on a second region 11 of semiconductor material, which is doped with an N-type impurity. These two regions, 10 and 11, contact each other at a junction 12. The two regions are shown mounted on a supporting block of insulating material 13. The block 13 contacts the region 11 at surface 14.

A stress-producing member 30, such as a stylus or a needle having a pointed tip 31, is shown in contact with a top surface 15 of the semiconductor region 10, and opposite the junction 12 between the regions 10 and 11. Leads 40 and 41 are connected to regions 10 and 11, respectively, by ohmic contacts 42 and 43.

Referring once again to the aforementioned copending applications, it has been found that barriers or junctions between regions of semi-conductor materials less than about 2 microns from the surface to which a stress is applied, such as by the member 30, should be used in order to obtain the highly electrical sensitivities mentioned previously. In addition, devices such as styluses or phonograph needles for producing stress, having pointed areas such as point 31, having a radius of curvature less than about 250 microns, produce the best observed effects when the pointed member is used to bear against the surface, such as surface 15, to produce a stress on the surface and thus produce a strain confined to a small volume of the barrier or junction 12 between the regions of semiconductor material.

Referring once again to FIGS. 1 and 2, there is disclosed a deformable material 20 for suspending, mounting, or positioning a stress-applying member in contact with a surface 15 of a semiconductor region. The material 20 is more easily deformed by the stress transmitted by stress-applying member than is the member 30 itself deformed by the effect of the transmitted stress. Accordingly, motion of the member 30, substantially perpendicular with respect to the barrier or junction 12, is permitted, inasmuch as the material 20 will deform in response to the transmission of stress by the stress-applying member 30. This material 20 permits the member 30 to be held in contact with the surface 15, and at the same time restrains the member 30 from moving parallel to the top surface 15 of the region of semiconductor material 10. Thus, an easily packagable device, which is particularly adaptable for mass production techniques, is achieved. Various suitable materials have been tested and have proved adequate, particularly epoxy resins, and polyester resins. One technique for applying an epoxy resin includes the steps of dipping the stress-producing member 30 in a vat of epoxy resin and then placing the member 30 in contact with the top surface 15 of the semiconductor region 10 to permit the epoxy resin gathered in the first step to flow into the configuration shown in FIG. 2, and subsequently set and harden to hold the member 30 in place. Other techniques, such as completely dipping the entire structure of FIG. 2, will produce a similar supported member structure. In addition to providing support of the member 30, particularly due to the adhesive qualities of the resin family, if an additional amount of resin were permitted to flow so as to completely encapsulate the regions of semiconductor material 10 and 11, an hermetically sealed junction device would be obtained. Other types of materials, such as silicon resins or wax, could be utilized. Additionally, it would be possible to solder the stress-producing member 30 to the top surface 15 of the semiconductor material 10 to obtain a similar result. Furthermore, the mounting technique described herein could be applied for the suspension of stress-producing members in conjunction with avalanche, or other multi-region devices. Accordingly, it is desired that this invention not be limited except as defined by the appended claims.

What is claimed is:

1. A device including a body of semiconductor material having two regions of opposite conductivity, one of said regions having a broad surface, a junction between said regions and disposed at a depth of less than about 0.010 inches from said surface and disposed in a plane parallel thereto, a member having a pointed tip engaging said broad surface for applying a stress to the underlying junction and means restricting the motion of said member parallel to said surface, said means comprising a deformable material enclosing said member and broad surface for permitting motion of said member substantially perpendicular to said junction.

2. A device in accordance with claim 1 wherein said deformable material comprises a resin material.

3. A device in accordance with claim 1 wherein said deformable material includes an adhesive substance.

4. A device in accordance with claim 1 wherein said deformable material comprises an epoxy resin.

5. A device in accordance with claim 1 wherein said deformable material comprises a polyester resin.

6. A device in accordance with claim 1 wherein said deformable material comprises a silicon resin.

7. A device in accordance with claim 1 wherein said deformable material comprises a solder.

8. A device in accordance with claim 1 wherein said member has a surface bearing on a surface of said material with a pointed tip having a radius of curvature of less than about 250 microns.

9. A device sensitive to variations in stress including a body of semiconductor material having two regions of opposite conductivity, one of said regions having a broad surface, a rectifying junction between said regions and disposed at a depth of less than 0.010 inches from said broad surface and disposed in a plane parallel thereto, means for producing a stress in said junction, said means for producing a strain comprising an elongated member bearing on said broad surface with a pointed tip having a radius of curvature of less than about 250 microns, and a deformable material enclosing said member and board surface and suspending said member in contact with said surface, said deformable material being pliable for permitting longitudinal movement of said member to cause variations in pressure upon said surface by said member and resultant stressing of a small area of the junction underlying said broad surface.

References Cited by the Examiner
UNITED STATES PATENTS

| | | |
|---|---|---|
| 2,530,745 | 11/1950 | Wallace. |
| 2,632,062 | 3/1953 | Montgomery. |
| 2,929,885 | 3/1960 | Mueller. |
| 3,107,277 | 10/1963 | Rogers. |
| 3,182,492 | 5/1965 | Sikorski. |

RICHARD M. WOOD, *Primary Examiner.*

W. L. CARLSON, *Examiner.*

E. L. STOLARUN, W. D. BROOKS, *Assistant Examiners.*